(12) United States Patent
Goel et al.

(10) Patent No.: US 10,963,709 B2
(45) Date of Patent: Mar. 30, 2021

(54) HIERARCHICAL MACHINE-LEARNING NETWORK ARCHITECTURE

(71) Applicant: Zoox, Inc., Foster City, CA (US)

(72) Inventors: Kratarth Goel, Albany, CA (US); Sarah Tariq, Palo Alto, CA (US)

(73) Assignee: Zoox, Inc., Foster City, CA (US)

(*) Notice: Subject to any disclaimer, the term of this patent is extended or adjusted under 35 U.S.C. 154(b) by 172 days.

(21) Appl. No.: 16/238,475

(22) Filed: Jan. 2, 2019

(65) Prior Publication Data

US 2020/0210721 A1    Jul. 2, 2020

(51) Int. Cl.
*G06K 9/00* (2006.01)
*G06K 9/32* (2006.01)
*G06K 9/62* (2006.01)
*G06N 3/04* (2006.01)

(52) U.S. Cl.
CPC ....... *G06K 9/00805* (2013.01); *G06K 9/3233* (2013.01); *G06K 9/6267* (2013.01); *G06N 3/04* (2013.01)

(58) Field of Classification Search
None
See application file for complete search history.

(56) References Cited

U.S. PATENT DOCUMENTS

| 2015/0175161 A1* | 6/2015 | Breed | B60W 30/09 348/148 |
| 2019/0391581 A1* | 12/2019 | Vardaro | A61B 5/0205 |
| 2020/0202145 A1* | 6/2020 | Mao | G05D 1/0221 |

OTHER PUBLICATIONS

Girshick, "Fast R-CNN", 2015 IEEE International Conference on Computer Vision (ICCV), IEEE, US, Dec. 2015, pp. 1440-1448.
The PCT Search Report and Written Opinion dated Apr. 29, 2020 for PCT Application No. PCT/US2019/067669, 13 pages.
Ren, et. al., "Faster R-CNN: Towards Real-Time Object Detection with Region Proposal Networks", IEEE Transactions on Pattern Analysis and Machine Intelligence, IEEE Computer Society, vol. 39, No. 6, Jun. 2017, pp. 1137-1149.

* cited by examiner

*Primary Examiner* — Suhail Khan
(74) *Attorney, Agent, or Firm* — Lee & Hayes, P.C.

(57) ABSTRACT

The techniques discussed herein may comprise refining a classification of an object detected as being represented in sensor data. For example, refining the classification may comprise determining a sub-classification of the object.

20 Claims, 5 Drawing Sheets

HIERARCHICAL MACHINE-LEARNING NETWORK ARCHITECTURE

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, and/or tracking objects. However, comparatively rare objects and/or behaviors may confuse computer vision systems, causing the computer vision system to incorrectly classify and/or fail to detect an object. For example, a rare object may include a pedestrian that is pushing or carrying a large object, a skateboarder, a pedestrian using stilts, an individual using a wheelchair, etc.

BRIEF DESCRIPTION OF THE DRAWINGS

The detailed description is described with reference to the accompanying figures.

In the figures, the left-most digit(s) of a reference number identify the figure in which the reference number first appears. The same reference numbers in different figures indicate similar or identical items.

DETAILED DESCRIPTION

Figure 1:
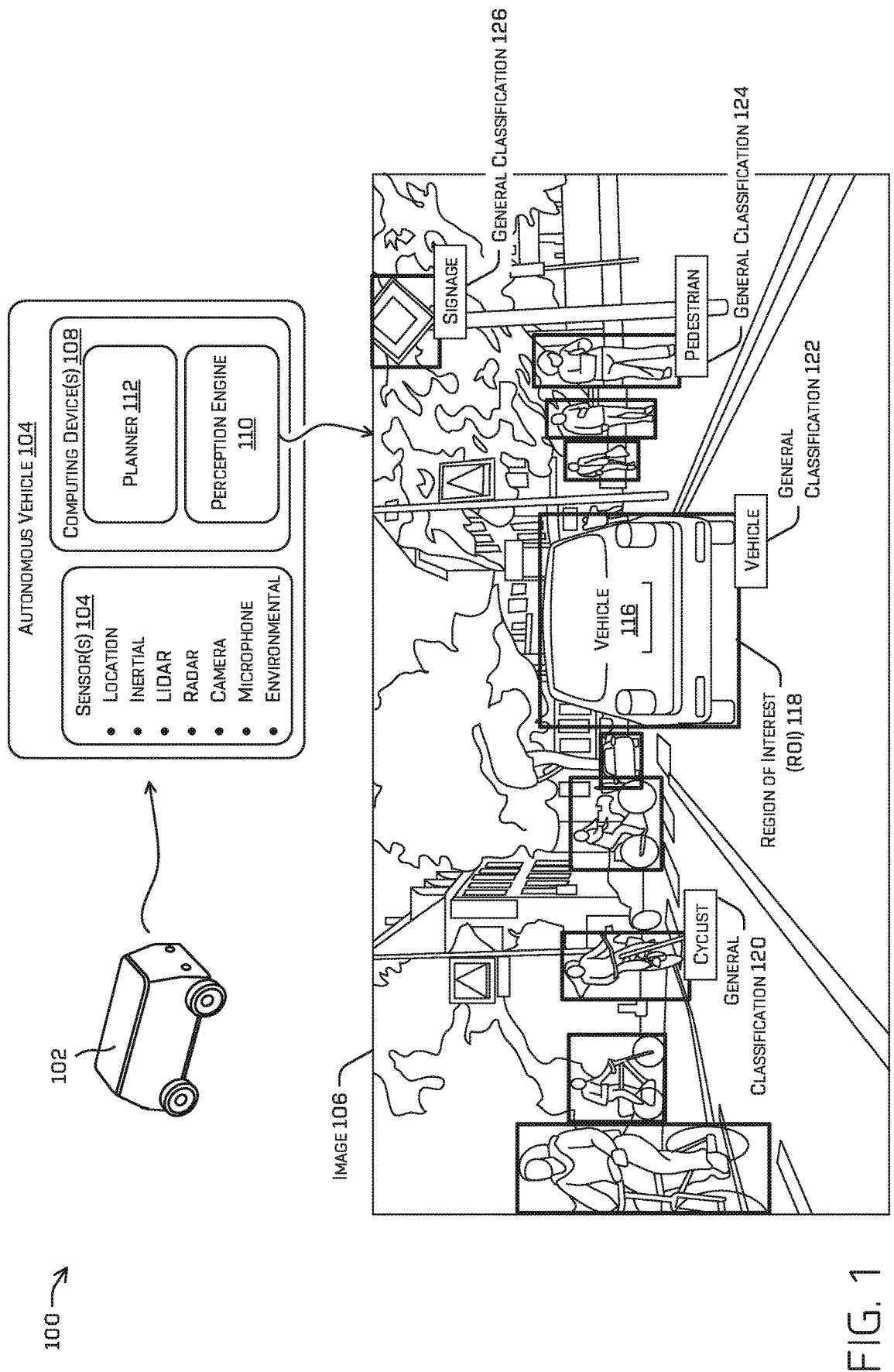
FIG. 1 illustrates an example scenario depicting an autonomous vehicle detecting multiple objects in an environment represented in sensor data.

The techniques discussed herein may improve computer vision by, for example, increasing the accuracy of object detection and/or increasing the trainability of a machine-learning (ML) model. Trainability is an indication of the extent to which an ML model can model the real world with high confidence (e.g., a probability, determined by an ML model, indicating a likelihood that an output of the ML model accurately models the real world and/or matches ground truth) and/or how difficult it is to train an ML model to model the real world accurately and with high confidence.

The techniques discussed herein may comprise a ML model structure that increases accuracy of the ML model and increases trainability of the ML model (e.g., decreases the complexity of training methods to achieve accuracies and/or confidences that meets or exceeds threshold, e.g., 98%, 99%, 99.999%). The techniques may comprise detecting an object from sensor data (e.g., an image, light detection and ranging (LIDAR) sensor data, RADAR sensor data) using a first ML model. The first ML model may receive sensor data and output a classification associated with the object and/or a region of interest (ROI) associated with a portion of the sensor data occupied by a representation of the object. The classification may indicate a general classification of the object such as, for example, "pedestrian," "vehicle," "cyclist," "signage", "animal", "traffic obstruction" (e.g., cones, barriers), etc. An ROI may be any manner of identifying a portion of sensor data that the ML model indicates as corresponding to the existence of an object. For example, an ROI may include coordinates indicative of pixels identified as being associated with the detected object (e.g., a "bounding box"), a mask that identifies pixels that correspond to the detected object, points of a LIDAR point cloud, etc.

The techniques may comprise receiving the classification and selecting, based at least in part on the classification, a sub-class ML model from among a plurality of sub-class ML models. Selecting the sub-class ML model may comprise determining a subset of one or more feature maps to provide to the sub-class ML model as input. In some examples, each sub-class ML model may be associated with a different classification, although it is understood that, in additional or alternate examples, two sub-class ML models may share a common classification. For example, a first sub-class ML model may be associated with a "pedestrian" classification, a second sub-class ML model may be associated with a "vehicle" classification, and so on. Therefore, if the first ML model outputs a "pedestrian" classification, the techniques may include selecting the first sub-class ML model. In some examples, a selection component may provide a first subset to a first sub-class ML model based at least in part on a first classification and a second subset to a second sub-class ML model based at least in part on a second classification. Such selection may be by logical statements (e.g., switch, if-then, etc.), as part of a pooling calculation in a model, as another subnetwork, or otherwise.

In some examples, the first ML model may additionally or alternatively output one or more feature maps. For example, the one or more feature maps may include an instance segmentation feature map, a semantic segmentation feature map, a detection feature map, etc. An instance segmentation feature map may identify discrete representations of different objects in an image and/or the semantic segmentation may identify a semantic label associated with a representation of an object in an image, as well as provide a unique identification to distinguish between two objects of the same semantic classification. A "segmentation" may comprise a mask and/or other identification of discrete portions of sensor data. For example, where the sensor data comprises an image, the segmentation may identify pixels of the image associated with a detection, label, etc.; where the sensor data comprises a LIDAR point cloud, the segmentation may comprise an identification of at least a subset of the points of the point cloud; etc.

Based at least in part on selecting a sub-class ML model, the techniques may additionally or alternatively comprise providing, as input to the selected sub-class ML model, at least a portion of an output of the first ML model. For example, the techniques may comprise cropping one or more feature maps and/or input to the first model, based at least in part on an ROI generated by the first model, and providing the cropped feature map(s) and/or ROI to the selected sub-class ML model. The selected sub-class ML model may then evaluate the sub-class ML model based at least in part on the cropped feature map(s) and/or ROI, thereby generating a sub-classification and/or probability associated with the object detected in the sensor data.

For example, if the first ML model generated a general classification, "pedestrian," in association with the object detected in the sensor data, the techniques may comprise selecting a first sub-class ML model associated with the classification "pedestrian." This sub-class ML model may be configured to attempt to identify a sub-classification of "pedestrian" associated with the object. For example, potential sub-classes of "pedestrian" may comprise sub-classes like "pedestrian pushing/pulling object," "pedestrian holding object," "wheeled pedestrian," "individual in wheelchair," etc.

In some examples, a classification and a first probability may be received from a first ML model, and a second probability and/or a sub-classification may be received from the selected sub-class ML model. The techniques may comprise determining whether the second probability meets or exceeds a probability threshold. If the second probability meets or exceeds the probability threshold, the techniques may comprise outputting the sub-classification in association with an output associated with the object (e.g., the output may indicate that a perception system has detected the object from sensor data received at the perception system). In some examples, the output may comprise at least a portion of one or more of the feature maps, the ROI, etc.

If the second probability is less than the probability threshold, the techniques may comprise determining whether the first probability meets or exceeds the probability threshold and outputting the classification in association with a detection of the object upon determining that the first probability meets or exceeds the probability threshold. In some examples, if the first probability is less than the probability threshold, the sub-class ML model may not be selected in the first place, obviating the need to determine whether the first probability meets or exceeds the probability threshold. In such an example, the techniques may comprise determining that the second probability is less than the probability threshold and outputting the classification in association with a detection of the object.

In an additional or alternate example, the techniques may comprise a first probability threshold associated with the first ML model and a second probability threshold associated with the sub-class ML model. In some examples, the first probability threshold may be greater than the second probability threshold, although in additional or alternate examples, the first probability threshold may be equal to or less than the second probability threshold.

In some examples, the techniques may additionally or alternatively comprise training the selected sub-class ML model and/or the first ML model by backpropagating loss through the sub-class ML model and/or the first ML model (e.g., for the classification associated with the sub-class ML model). In some examples, the loss may be backpropagated for the sub-classification and/or probability generated by the sub-class ML model and/or the classification, probability, one or more feature maps, and/or ROI generated by the first ML model. In some examples, a first loss may be calculated for the first ML model (e.g., based at least in part on ground truth that specifies an ROI and/or a classification) and a second loss may be calculated for a sub-class ML model (e.g., based at least in part on ground truth that specifies a classification and/or a sub-classification). In those examples where multiple models are used, the sub-class ML model may be trained using the second loss and/or the first ML model may be trained based at least in part on backpropagating the first loss and/or the second loss (i.e., training the model end-to-end). Backpropagating the second loss to train the first ML model may further refine the accuracy of the first ML model. In other examples where a single model (e.g., neural network) is used, the model may use one or more losses and propagate the losses back for refinement.

The techniques described herein may improve the accuracy of detections of objects by increasing the specificity with which an object may be classified and/or increasing a confidence score generated by the first ML model and/or the sub-class ML model in association with an object detection. Moreover, the techniques discussed herein fine-tune training of the first ML model in a manner that may not be achievable without the techniques discussed herein. For example, backpropagating loss from the sub-class ML model(s) through the first ML model may further improve the confidence and/or accuracy of classifications determined by the first ML model (while simultaneously improving the confidence and/or accuracy of the sub-class ML mode(s) as well). Furthermore, the techniques discussed herein may achieve satisfactory accuracy (e.g., greater than 95% or 98% accuracy) for "rare" types of objects, even when sparse training data is available. For example, the amount of training data available for passenger vehicles may far exceed the amount of training data available for individuals in wheelchairs, individuals using stilts, etc.

The techniques discussed herein may improve the safety of system(s) that integrate the techniques discussed herein. For example, by implementing the techniques discussed herein as a sub-system of an autonomous vehicle, the autonomous vehicle may operate more safely and/or efficiently. The techniques may comprise controlling operation of the autonomous vehicle based at least in part on a subclass and/or by reverting to controlling the autonomous vehicle based at least in part on a general classification if a probability associated with a subclass is less than a probability threshold.

Example Scenario

FIG. 1 illustrates an example scenario 100 including an autonomous vehicle 102 that detects multiple objects in an environment surrounding the autonomous vehicle from sensor data collected by one or more sensors. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 102 may receive image 106 from the sensor(s) 104. The discussion herein primarily discusses images, for ease, but it is contemplated that the techniques may be applied to any sensor data that discretely represents an object (e.g., a LIDAR and/or RADAR point cloud including points that represent an object).

In some examples, the autonomous vehicle may include computing device(s) 108 that may include a perception engine 110 and/or a planner 112. The perception engine 110 may include one or more ML models and/or other computer-executable instructions for detecting, identifying, segmenting, classifying, and/or tracking objects from sensor data collected from the environment of the autonomous vehicle 102. In some instances, the perception engine 110 may receive sensor data from sensor(s) 104 of the autonomous vehicle 102, determine perception data from the sensor data, and transmit the perception data to a planner 112 for use by the planner 112 to localize a position of the autonomous vehicle 102 on a global map and/or a local map, determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). In some instances, the perception data may comprise an ROI and/or a general classification associated with an object detected from sensor data.

In the illustrated example, autonomous vehicle 102 may receive image 106 (and/or other sensor data), which includes a representation of a vehicle 116, multiple cyclists, multiple pedestrians, multiple signage objects, and a variety of different environmental objects (e.g., roadway, sidewalk, trees, buildings). The perception engine 110 may generate an ROI 118 based at least in part on detecting vehicle 116 as being represented in image 106. In the illustrated example, the ROI 118 is a bounding box, although other techniques for identifying the ROI are contemplated. FIG. 1 additionally depicts multiple other ROIs that may be generated by the perception engine 110 for different objects that may be detected by the perception engine 110, but, for simplicity and clarity, they are not all labeled. For example, the other ROIs identify cyclists, another vehicle, and traffic signage, although it is understood that additional or alternative portions of an image (and/or other sensor data) may be detected by the perception engine 110.

In some examples, the perception engine 110 may additionally or alternatively determine, by a first ML model, a general classification of an object. For example, the first ML model may be trained to output an indication of one classification, from among a plurality of general classifications, that corresponds with a highest probability determined by the ML model. In some examples, the general classifications may include labels associated with a top level of a hierarchy. The general classifications may include classifications such as, for example, "cyclist," "vehicle," "pedestrian," "animal," "environmental object," etc. In the depicted example, these general classification include general classification 120, "cyclist"; general classification 122, "vehicle"; general classification 124, "pedestrian"; and general classification 126, "signage". Although, for the sake of clarity, only a sampling of general classifications are depicted in FIG. 1, it is understood that the first ML model of the perception engine 110 may determine a general classification for one or more of the ROIs and/or objects detected from the sensor data.

The techniques discussed herein may additionally or alternatively comprise a structure that includes the first ML model and one or more sub-class ML model(s). The structure may be configured such that an output of the first ML model may correspond to at least one of the one or more sub-class ML model(s). In some examples, the first ML model may output a general classification, from among a plurality of candidate classifications, which may be used to select at least one of the sub-class ML model(s). For example, although the candidate classifications may comprise "cyclist", "pedestrian", "signage", etc., the first ML model be trained to output general classification 122, "vehicle", in correspondence with pixels associated with ROI 118. In at least some examples, though described as a first ML model and additional sub-class ML model(s), a single ML model may comprise the first ML model and the sub-class ML model(s). That is to say that output from one layer of the model may comprise the general classification and other layers of such a model may output the sub-classification.

A sub-class ML model may be associated with a particular classification of the plurality of candidate classifications of the first model. For example, a first sub-class ML model may be associated with "pedestrian", a second sub-class ML model may be associated with "vehicle", and so on. Based at least in part on an output of the first ML model, the structure may select a sub-class ML and provide one or more outputs of the first ML model to the sub-class ML model as input. The sub-class ML model may determine a sub-classification associated with the object from among a plurality of candidate classifications.

In some instances, the planner 112 may use perception data, including an ROI, general classification, sub-classification, and/or feature map to generate instructions for controlling operation of the autonomous vehicle 102. For example, the planner 112 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second, multiple seconds, etc.) and based at least in part on an ROI, general classification, sub-classification, and/or feature map, to control the vehicle to traverse the route; and select one of the potential trajectories as a trajectory of the autonomous vehicle 102 that may be used to generate a drive control signal that may be transmitted to drive components of the autonomous vehicle 102.

Example First ML Model Architecture

Figure 2:
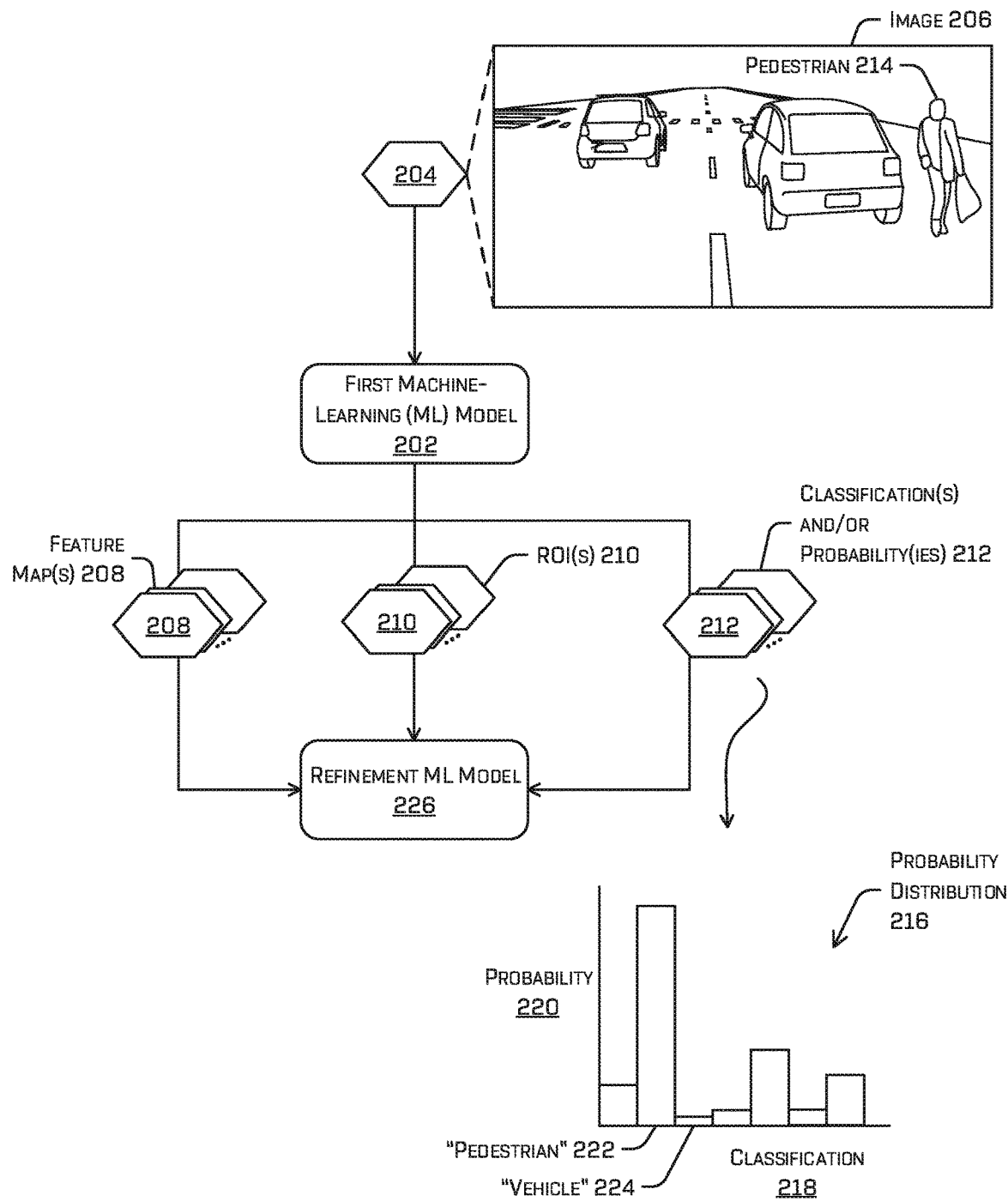
FIG. 2 illustrates a block diagram of an example architecture of a first machine-learning model.

FIG. 2 illustrates additional details regarding an example architecture 200 of the first ML model 202. In some examples, the first ML model 202 may receive sensor data 204 from one or more sensors. In some examples, the sensor data 204 may comprise image(s), such as, for example, image 206 and/or LIDAR data, RADAR data, biometric data, environmental data, etc. Image 206 may comprise an image such as, for example, a grayscale image, a red-green-blue (RGB) image, a time of flight image, a depth image, an infrared image, an image of LIDAR points (and/or other three or more dimensional sensor data points) projected into a two-dimensional space, and/or any combination thereof. It is understood that the first ML model 202 may additionally or alternatively comprise receiving other types of sensor data from one or more sensors (e.g., a point cloud from a LIDAR sensor and/or RADAR sensor).

The first ML model 202 may comprise a neural network such as, for example, a convolutional neural network (CNN). In some examples, first ML model 202 may comprise multiple layers, one or more of which may generate an output. In some examples, the first ML model may comprise component(s) to aggregate output(s) of one or more layers, component(s) to pool portions of feature maps corresponding to a same detection, etc.

The first ML model 202 may output, based at least in part on the sensor data 204, one or more feature maps ("feature map(s) 208"), one or more ROIs ("ROI(s) 210"), and/or one or more classifications and/or probabilities ("classification(s) and/or probability(ies) 212), according to weights associated with the various layers of the first ML model 202 and learned at training, at least in examples where the first ML model comprises a neural network. For example, the first ML model 202 may generate an instance segmentation feature map, semantic segmentation feature map, a dense depth feature map, an object orientation feature map (e.g., a feature map that identifies an estimated orientation of detected objects), and/or a detection feature map, based at least in part on the sensor data 204 and weights associated with the layers of the first ML model 202. An instance segmentation feature map may comprise a mask that identifies pixels (and/or other discrete portions of the sensor data) that are associated with an object and/or additional data associated therewith as determined by the model. Although the discussion here attempts to explain the content of some of the feature map(s), it is understood that one or more of the feature map(s) 208 may not be described in humanly comprehensible terms, as the feature map(s) 208 may comprise an output of the first ML model 202 that may be a computer and/or neural network transformation of the sensor data 204. In at least some examples, such feature map(s) 208 need not be from the same model, but from any number of models which provide additional information with respect to the object (e.g., segmentations, classifications, detections, etc. performed on the sensor data and associated with the object).

In some examples, an ROI (of the ROI(s) 210) associated with an object may identify a portion of the image 206 (and/or other sensor data) and/or a portion of the feature map(s) 208 as corresponding to an object such as, for example, pedestrian 214. For example, the ROI may comprise a center and dimensions of a shape, such as a rectangle (i.e., a bounding box), and/or any other identification of a portion of the image attributable to an object, and/or uncertainties associated therewith. In some instances, the ROI may be a more "rough" identification of a portion of the sensor data 204 that is associated with an object (e.g., the ROI may comprise a same shape for each object detected and may be sized so that the object fits within the ROI, in other words the ROI may identify more than just the object in some instances), as opposed to an instance segmentation, which may identify discrete portions of the sensor data 204 that are associated with an object and/or provide a unique identifier for the object to differentiate between multiple detected objects.

In an additional or alternate example, first ML model 202 may generate classification(s) and/or probability(ies) 212. The first ML model 202 may generate a classification and/or probability based at least in part on a portion of the sensor data 204 associated with an ROI and/or instance segmentation. The first ML model 202 may thereby identify a portion of the sensor data 204 as being associated with a classification and, in some examples, a likelihood (probability) that the classification is correctly associated with the portion of the sensor data 204. In some examples, the first ML model 202 may generate a probability distribution associated with an object, such as pedestrian 214, as the classification and/or probability. The illustrated example depicts a probability distribution 216 associated with pedestrian 214. For example, the first ML model 202 may have generated probability distribution 216 based at least in part on an ROI and/or instance segmentation generated by a layer of the first ML model 202 and associated with the representation of pedestrian 214. In some examples, the first ML model 202 may generate the probability distribution 216 based at least in part on the sensor data 204 itself, a subset of the feature map(s) 208, and/or ROI(s) 210, etc.

The probability distribution 216 may identify a probability associated with a general classification, wherein the probability indicates a likelihood that a portion of the sensor data corresponds with an object of a type identified by the classification. FIG. 2 depicts the probability distribution 216 as a bar graph plotting candidate classifications on the x-axis (218) and corresponding probabilities (220) determined for each candidate classification on the y-axis. For example, in the depicted example, a candidate classification "pedestrian" 222 is associated with a much greater probability than the candidate classification "vehicle" 224 (in the depicted example, probability distribution 216 was generated by the first ML model 202 based at least in part on a portion of the sensor data 204 and/or feature map(s) 208 associated with pedestrian 214).

In some examples, the first ML model 202 the output the feature map(s) 208, ROI(s) 210, and/or classification(s) and/or probability(ies) 212 to a refinement ML model 226 (e.g., by a concatenation, or otherwise). The refinement ML model 216 may comprise one or more sub-class ML models, as discussed in more detail in FIG. 3. Although depicted as different ML models, the refinement ML model 216 and the first ML model 202 may be part of a single ML model (e.g., different sets of layers of a neural network in an example where the first ML model 202 and/or the refinement ML model 226 comprise a neural network).

Example Architecture

Figure 3:
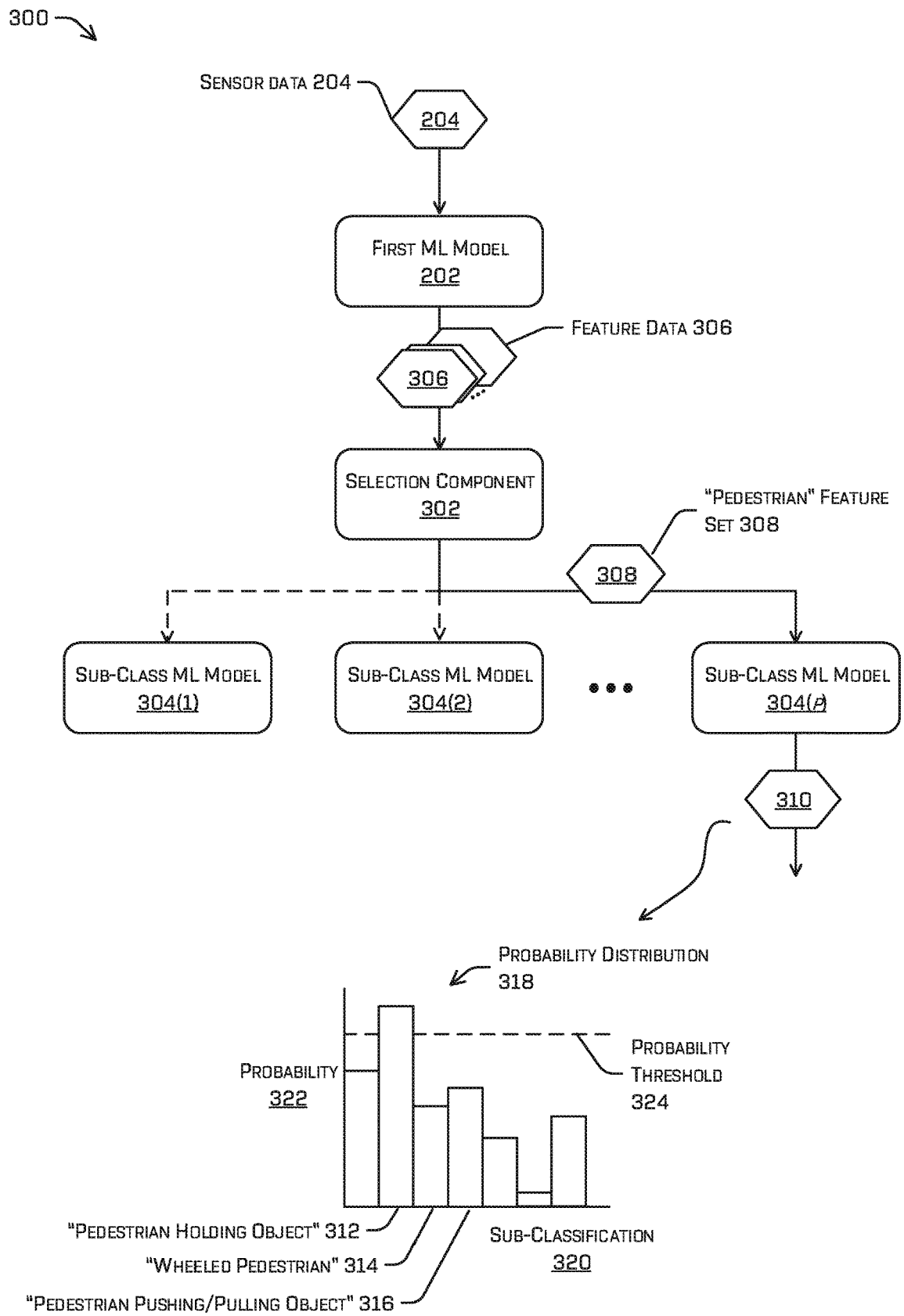
FIG. 3 depicts a block diagram of an example machine-learning model architecture for improving the accuracy of computer vision and/or improving the trainability of a perception system.

FIG. 3 depicts a block diagram of an example architecture 300 for improving the accuracy of computer vision and/or improving the trainability of the perception system. In some examples, example architecture 300 may represent a portion of a perception engine, such as perception engine 110.

In the depicted example, the example architecture 300 may comprise the first ML model 202, a selection component 302, and/or one or more sub-class ML models 304(1)-304(p), collectively "sub-class ML model(s) 304." In some examples, the selection component 302 and/or the sub-class ML model(s) 304 may be part of the refinement ML model 226. First ML model 212 may receive sensor data 204 and, based at least in part on the sensor data 204, may generate feature map(s) 208, ROI(s) 210, and/or classification(s) and/or probability(ies) 212, collectively represented as feature data 306. In some examples, the feature data 306 may comprise a set of data associated with an object detected from the sensor data 204. For example, the feature data 306 may comprise first feature map(s), a first ROI, and/or a first classification and/or a first probability associated with a first object; second feature map(s), a second ROI, and/or a second classification and/or a second probability associated with a second object; and so on.

In some examples, the feature data 306 may be received by the selection component 302. The selection component 302 may select at least one of the sub-class ML model(s) 304 based at least in part on a classification received from the first ML model 202. In some examples, selection may be performed by logical statements (switch, if-then, etc.), a pooling operation associated with classification output, a sub-model within the sub-class ML model, first ML model, or learned different model, and the like. In some examples, an individual sub-class ML model, e.g., sub-class ML model 304(p), may be associated with one or more of the candidate classifications (e.g., the classifications that are possible to be output from the first ML model 202) associated with the first ML model 202. In at least one example, p may be an integer equal to the number of candidate classifications associated with the first ML model, although, in an additional or alternate example, p may be an integer less than or greater than the number of candidate classifications.

For example, if the selection component receives feature data 306 comprising a first set of data comprising a first classification from the first ML model (e.g., "vehicle"), the selection component 302 may select a first sub-class ML model associated with the first classification; if the feature data 306 further comprises a second set of data comprising a second classification (e.g., "pedestrian"), the selection component 302 may select a second sub-class ML model associated with the second classification; and so on. In some examples, the selection component 302 may determine which sub-class ML model of the sub-class ML model(s) 304 to which to transmit each set contained within the feature data 306. In other words, the feature data 306 may comprise sets of feature data for each object detected by the first ML model 202 and the selection component 302 may comprise a hardware and/or software switch to route sets of feature data associated with different objects to the appropriate sub-class ML model, based at least in part on classification associated with a set of feature data.

In the depicted example, sub-class ML model 304(p) may be associated with the classification "pedestrian". Based at least in part on receiving a set of feature data 306 that includes the classification "pedestrian" from the first ML model 202, the selection component 302 may select sub-class ML model 304(p) to determine a sub-class and/or further process the set. The selection component 302 may transmit any of the sets of the feature data 306 associated with the classification "pedestrian" as a "pedestrian" set 308 to sub-class ML model 304(p). For example, "pedestrian" feature set 308 may comprise at least a portion of one or more feature maps generated by the first ML model 202 associated with pedestrian 214 (classification feature maps, segmentation feature maps, detection feature maps, other feature maps, and the like). In an additional or alternate example, the "pedestrian" feature set 308 may additionally or alternatively comprise an ROI, classification, and/or probability, although, in some examples, the ROI may be used to determine the portion(s) of feature map(s) associated with a detected object and the classification may be used to determine the sub-class ML model to which to send the portion(s).

In an additional or alternate example, the selection component 302 may determine a portion of feature map(s) to provide as input to the selected sub-class ML model, e.g., sub-class ML model 304(p) in the depicted example. For example, the selection component 302 may crop and/or otherwise identify a portion of one or more of the feature map(s) to provide to the selected sub-class ML model based at least in part on an ROI received from the first ML model 202.

In some examples, an individual sub-class ML model 304(p) may be trained to output (310) a sub-classification and/or a probability from among one or more candidate sub-classifications that are associated with the general classification with which the sub-class ML model 304(p) is associated. For example, if sub-class ML model 304(p) is associated with the classification "pedestrian", the candidate sub-classifications associated with sub-class ML model 304(p) may comprise "pedestrian holding an object" 312, "wheeled pedestrian" 314 (e.g., individual riding a skateboard, scooter, Segway™, other personal transportation), "pedestrian pushing/pulling object" 316, "individual in wheelchair", "individual using stilts", "child", "construction worker", "public safety official", etc. In some examples, the output 310 may comprise a probability distribution 318 over the candidate sub-classifications associated with sub-class ML model 304(p). Probability distribution 318 is depicted in FIG. 3 as a bar graph comprising example candidate sub-classifications 320 on the x-axis and probabilities 322 on the y-axis.

To further illustrate, a different sub-class ML model associated with the classification "signage" may be associated with candidate sub-classifications "traffic sign", "billboard", "poster", "other advertisement", etc. Moreover, a sub-class model may be parent to an additional (and/or lower) level of sub-class ML models. For example, the first ML model may be associated with general classifications, "vehicle", "pedestrian", "signage", etc.; a first sub-class ML model may be associated with the classification "signage" and may be associated with, as a parent to, a second sub-class ML model that is associated with the sub-classification "traffic sign". "Traffic sign" may be a candidate class of the first sub-class ML model and the second sub-class ML model that is a child thereof may be associated with the candidate sub-classifications "stop sign", "yield sign", "speed sign", "lane merge sign", etc.

In other words, the example architecture 300 may comprise a hierarchical structure of parent ML models and child ML models associated by classification where a child ML model is trained to output sub-classifications associated with a classification generated by a parent ML model. The classifications and/or sub-classifications generated by the ML models discussed herein may reflect the hierarchical structure of the ML models. For example, a "yield sign" may be indicated by the second sub-class ML model as "signage: traffic sign:yield sign".

Returning to the depicted example, based at least in part on the set of feature data received from the selection component 302 (e.g., which may comprise at least a portion of one or more feature maps associated with an object, and, in some examples, additionally or alternatively an ROI and/or classification and/or probability), sub-class ML model 304(p) may generate probability distribution 316. In some examples, the sub-class ML model 304(p) output a sub-classification and/or a probability, as part of the output 310. For example, the sub-class ML model 304(p) may determine a candidate sub-classification that is associated with a probability meeting or exceeding a probability threshold 324 and/or that is a greatest probability over the probability distribution 318.

In some examples, based at least in part on determining one of the sub-classifications to output, the sub-class ML model 304(p) may determine whether the output sub-classification meets or exceeds a probability threshold 324. For example, even though the sub-classification may be associated with a maximum probability of all the probabilities in the probability distribution 320, the probability may still be too low to be relied upon (e.g., less than 95%, less than 90%, less than 80%, less than 70%). If the probability associated with the output sub-classification is less than the probability threshold 324, the sub-class ML model 304(p) may output the classification received from the first ML model 202 instead of the sub-classification. However, if the probability meets or exceeds the probability threshold, the sub-class ML model 304(p) may output the sub-classification. In an additional or alternate example, the sub-class ML model 304(p) may output the sub-classification in addition to the general classification, even though the sub-classification is associated with a probability below the probability threshold, although in some examples, the sub-class ML model 304(p) may additionally or alternatively output an indication that the sub-classification is associated with a probability less than the probability threshold 324.

In the illustrated example, sub-class ML model 304(p) may output the sub-classification "pedestrian holding object" 314 and/or the probability associated therewith based at least in part on determining that the sub-classification "pedestrian holding object" 314 is associated with a probability that meets or exceeds the probability threshold 326 and/or that the probability is the greatest probability of the plurality of probabilities of the probability distribution 318. However, if sub-class ML model 304(p) were to determine that, even though the sub-classification "pedestrian holding object" 314 was associated with a probability that was less than the probability threshold 326, the sub-class ML model 304(p) may output "pedestrian" instead of "pedestrian holding object" 314.

In an example where the sub-class ML model 304(p) is a parent to an additional sub-class ML model (unillustrated) (e.g., a sub-class model associated with the general classification "signage", an additional sub-class model associated with the sub-classification "traffic signage"), based at least in part on determining that a sub-classification determined by the sub-class ML model 304(p) meets or exceeds the probability threshold 326, the sub-class ML model 304(p) may transmit the sub-classification to the additional child sub-class ML model, which may determine a sub-classification (of the sub-classification) and/or probability. However, if the sub-class ML model 304(p) determines that the sub-classification is less than the probability threshold 324, the sub-class ML model 304(p) may bypass the additional sub-class ML model and output the general classification instead.

In some examples, the classifications and the sub-classifications may comprise semantic label(s) and/or a data structure to differentiate between hierarchically related classifications. For example, a semantic label generated by a sub-class ML model two levels of ML models down the structure from the general classification determined by the first ML model 202 may be represented as "signage:traffic:stop sign".

In some examples, the training data for different ML models may vary depending on the general classification (i.e., the candidate classification of the parent with which a sub-class ML model is associated) and/or candidate classifications with which they are associated. For example, a first sub-class ML model associated with the general classification "signage" may be trained on training data that comprises various signs. In some examples, the training data for the first sub-class ML model may exclusively comprise training data that includes at least one sign, although in additional or alternative examples, the training data may comprise data that does not include signs to train the sub-class ML model negatively as well (e.g. what is not a sign). Whereas, a second sub-class ML model associated with the general classification "pedestrian" may be trained on training data that may or may not contain signs, but does contain objects related to rare classifications such as "individual in wheelchair", etc. The first ML model may be more broadly trained to differentiate between general classes, but, in some examples, not to differentiate between sub-classes. For example, first ML model may be trained using ground truths that indicate "pedestrian", "vehicle", "sign", etc., but not "pedestrian holding object", "individual in wheelchair", "four-wheeled vehicle", "stop sign", "yield sign", "speed sign", etc.

In an additional or alternate example, a first loss may be calculated for the first ML model 202 based at least in part on an output of the first ML model 202 compared to first training data (e.g., which may comprise ground truth) and a second loss may be calculated for a sub-class ML model associated with a candidate classification of the first ML model 202. The second loss may be based at least in part on a difference between an output of the sub-class ML model and ground truth indicated by first training data and/or second training data. Parameters associated with the sub-class ML model may be altered to minimize the second loss. Parameters associated with the first ML model 202 may be altered to minimize the first loss and/or the second loss. In some instances, the ground truth indicated by training data may comprise a tag that indicates a correct hierarchy of classifications. For example, a ground truth may comprise a tag such as "vehicle:four-wheeled vehicle:sedan" or "signage:traffic sign:yield sign". In some examples, the loss calculated for the first ML model 202 and/or one or more sub-class ML models may be based at least in part on the such a hierarchical tag. Such first and second losses may be in addition, or alternative to, a third loss associated with the classification, detection, and/or segmentation (which may be an instance segmentation) performed by the first ML model 202.

Training may comprise altering parameters of neural networks from a top of the hierarchy (e.g., at the first ML model 202) down to the lowest neural network that received feature data. For example, if a classification "signage:traffic sign:yield sign" was ultimately output, the first ML model 202 and at least two sub-class ML models may be trained based at least in part on loss(es) calculated for the ML models. In an additional or alternate example, if a classification "signage:traffic sign" was ultimately output, the first ML model 202, a first sub-class ML model (associated with "traffic sign"), and/or a further sub-class ML model may be trained. For example, the further sub-class ML model may have received feature data from the first sub-class ML model but may not have generated a classification associated with a probability that meets or exceeds a probability threshold.

In some examples, the first ML model 202 may be trained first and sub-class ML models may be trained once the first ML model 202 has reached a sufficient accuracy. For example, the first ML model 202 may be trained until the first ML model 202 outputs a classification that meets or exceeds a probability threshold. In an additional or alternate example, the first ML model 202 may be trained simultaneously with one or more layers of sub-class ML models.

In some examples, loss calculated for a sub-classification ML model may be backpropagated through the sub-classification and/or any parent ML model(s) up to and including the first ML model. In such examples, e.g., where one or more models are used, the model may be referred to as being trained "end-to-end."

Although the discussion herein discusses a somewhat sequential architecture and process, the example architecture 300 may comprise parallel pipelines. Any of the components discussed herein may accomplish the operations sequentially and/or in parallel. For example, different ROIs, classifications, and/or probabilities may be processed in parallel by different sub-class ML model(s) and/or selection component(s).

In some instances, one or more of the component(s) discussed herein may be implemented in whole, or in part, as a neural network. As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

Example Process

Figure 4:
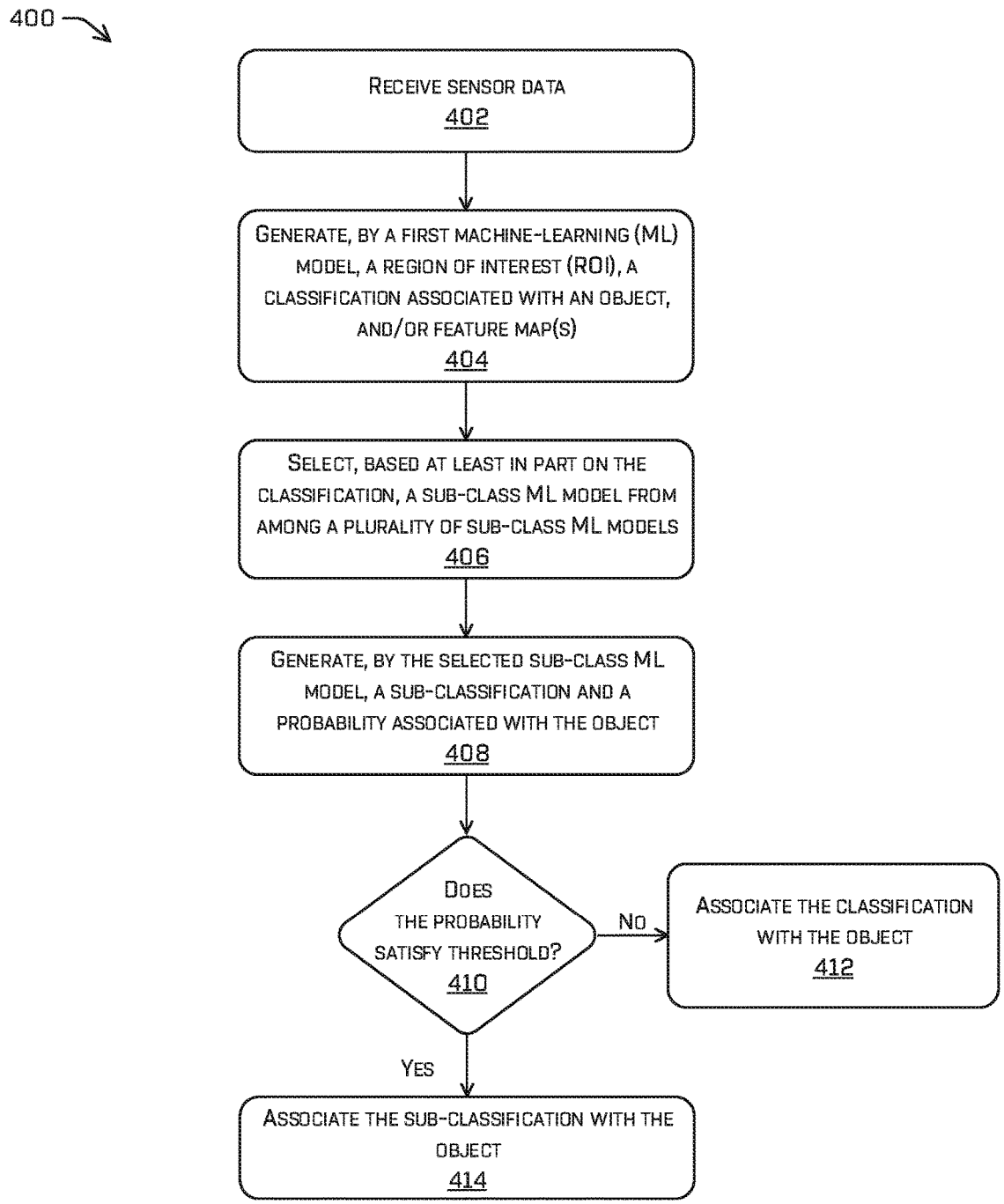
FIG. 4 illustrates a flow diagram of an example process for determining a sub-classification of an object represented in sensor data.

FIG. 4 illustrates an example process 400 for determining a sub-classification of an object represented in sensor data. In some examples, example process 400 may be accomplished by component(s) of example architecture 300.

At operation 402, example process 400 may comprise receiving sensor data, according to any of the techniques discussed herein.

At operation 404, example process 400 may comprise generating, by a first ML model, an ROI, classification associated with an object, and/or one or more feature maps, according to any of the techniques discussed herein. In some examples, according to the architecture discussed herein, the first ML model may be a parent (and/or a subnetwork) to one or more child ML models (which may be different ML model(s) and/or additional subnetworks of a same ML model as the first ML model), where each child ML model (i.e., sub-class ML model) corresponds to a different candidate classification that the first ML model is trained to generate a probability distribution for. In an additional or alternate example, the classifications with which the child ML models are associated may overlap, such that two or more sub-class models may generate a sub-class and/or classification probability based at least in part on a classification output by the first ML model. In some examples, the classification may be associated with the ROI and/or otherwise associated with a representation of the object in the sensor data.

At operation 406, example process 400 may comprise selecting, based at least in part on the classification generated by the first ML model, a sub-class ML model from among a plurality of sub-class ML models, according to any of the techniques discussed herein. In some examples, operation 406 may further comprise identifying which sub-class ML models are associated as children to the first ML model. However, in an additional or alternate example, the sub-class ML models may be communicatively coupled (e.g., by hardware and/or by a software switch) to the first ML model such that an output of the first ML model is transmitted directly to a sub-class ML model that corresponds to the classification indicated by the output of the first ML model. Regardless, selecting the sub-class ML model may comprise determining that the sub-class ML model is associated with the classification generated by the first ML model. In an additional or alternate example, first ML model and the sub-class ML model(s) may be sub-portions of a same neural network. In such an example, operation 406 may be omitted.

In some examples, operation 406 may additionally or alternatively comprise determining a portion of data generated by the first ML model to provide to the selected sub-class ML model. For example, the first ML model, in addition or alternatively to generating the ROI and/or classification, the first ML model may generate one or more feature maps such as, for example, an instance segmentation, semantic segmentation, a dense depth feature map, an object orientation feature map, a detection feature map, etc. At operation 406, the example process 400 may comprise determining portion(s) of the one or more feature maps to provide to the selected sub-class ML model that correspond to an object represented in the sensor data. This may comprise cropping and/or otherwise selecting portion(s) of a feature map that correspond to an ROI and/or other indication of the discrete portions of the sensor data that correspond to an object. Once the portion(s) have been determined, the portion(s), ROI determined by the first ML model, and/or classification determined by the first ML model may be provided to the sub-class ML model. In some examples, this may be repeated for one or more objects detected from the sensor data (e.g., for each object detected, a sub-class ML model may be selected, at least a portion of one or more feature map(s) determined, and the portion(s) provided to the selected sub-class ML model).

In some examples, the first ML model may comprise q channels, where q may be an integer chosen to correspond to a dimension of the sensor data received by the ML model. In some examples, sub-class ML model may comprise r channels, where r may be an integer that corresponds to a dimension of an output layer of the first ML model that generates an ROI and/or feature map.

At operation 408, example process 400 may comprise generating, by the selected sub-class ML model, a sub-classification and/or a sub-classification probability associated with the object, according to any of the techniques discussed herein. For example, generating the sub-classification and/or the probability may be based at least in part on the portion(s) of the feature map determined above and/or input to the first ML model, the ROI determined by the first ML model, and/or the classification determined by the first ML model. Although, once trained, in some examples, the sub-class ML model may not receive the classification and/or the ROI determined by the first ML model since the sub-class ML model may be trained to generate the sub-classification and/or probability based at least in part on the portion(s) of the feature map determined to correspond to the object. In some examples, a selection component may ensure that portion(s) are routed to the correct sub-class ML model that corresponds to the classification generated by the first ML model. For example, the selection component may comprise a layer of a neural network designed to transmit data from an output node of a parent ML model to an input node of a child ML model and/or a hardware and/or software switch.

In some examples, the sub-class ML model may determine a probability distribution over the candidate sub-classifications that the sub-class ML model has been trained on. In some examples, the sub-class ML model may determine one of the candidate sub-classifications that is associated with a probability greater than others of the candidate classifications. This sub-classification may be associated with a local maximum, a maximum, a probability greater than an upper quartile, etc.

At operation 410, example process 400 may comprise determining whether the probability associated with the sub-classification generated by the sub-class ML model satisfies a probability threshold (e.g., whether the probability meets or exceeds the probability threshold), according to any of the techniques discussed herein. The probability threshold may comprise a value such as, for example, 99%, 98%, 95%, 90%, 80%, 75%, etc. Operation 410 may additionally or alternatively comprise determining whether a difference between a probability that is greater than other probabilities of a probability distribution to a second-greatest probability and determining whether the difference meets or exceeds a discrimination threshold. For example, if a first probability is 95% and a second probability is 92%, where the discrimination threshold is 5%, the difference between the first probability and the second probability does not meet or exceeds the discrimination threshold since the difference is 3%. This may indicate that the model has not sufficiently discriminated between classifications and is highly confident that an object is simultaneously two different classifications. In some examples, certain classifications may be co-output, and/or other classifications may be associated with a discrimination threshold. For example, sub-classification "individual pulling/pushing object" may be co-output with sub-classification "child", but "individual pulling/pushing object" may be associated with a discrimination threshold as related to the sub-classification "wheeled pedestrian".

If the probability associated with the sub-classification is less than the probability threshold, example process 400 may proceed to operation 412. In some examples, the output of the first ML model and/or the sub-class ML model may additionally or alternatively be output via last layers of the first ML model and/or the sub-class ML model, respectively. At operation 412, example process 400 may comprise associating the classification with the object, according to any of the techniques discussed herein. For example, this may comprise associating the classification generated by the first ML model with the object instead of associating the sub-classification generated by the sub-class ML model with the object. In examples where the sub-class ML model is associated as a parent to child sub-class ML models, these sub-class ML models may be skipped and the classification may be output. In an additional or alternate example, based at least in part on determining that the probability does not meet the probability threshold, the portion(s), ROI, and/or classification may be provided to an alternate sub-class ML model. For example, the alternate sub-class ML model may be additionally associated with the classification or, in an additional or alternate example, the sub-class ML model may be associated with a second classification determined by the first ML model that was associated with a probability that was less than a probability associated with the classification. For example, the second classification may be associated with a second-greatest probability. To illustrate, the first sub-class ML model may be associated with the parent candidate classification, "traffic signage", and the second sub-class ML model may be associated with the parent candidate classification, "billboard".

If the probability associated with the sub-classification meets or exceeds the probability threshold, example process 400 may proceed to operation 414. At operation 414, example process 400 may comprise associating the sub-classification with the object, according to any of the techniques discussed herein. Associating the sub-classification with the object may comprise outputting the sub-classification as part of a detection message published by the perception engine over a channel to components (e.g., a planner, a localization and mapping component) that subscribe to that channel (e.g., via publish-subscribe architecture).

In an additional or alternate example, if the sub-class ML model is related as a parent to other sub-class ML models, the sub-class ML model may transmit the sub-classification and/or portion(s) of the feature map(s) to a child sub-class ML model that corresponds to the sub-classification. The process described above at operations 408-414 may be repeated at the child sub-class ML model. However, if a sub-classification generated by the child sub-class ML model is less than a second probability threshold (e.g., which may equal, exceed, or be less than the probability threshold), instead of associating the classification with the object, the example process 400 may comprise associating the sub-classification of the sub-class ML model with the object. In some examples, an ROI, classification, and/or probability may be output by the first ML model and a sub-classification and/or probability may additionally or alternatively be output by any sub-class ML model that the feature data reaches (e.g., by selection/forwarding).

Example System

Figure 5:
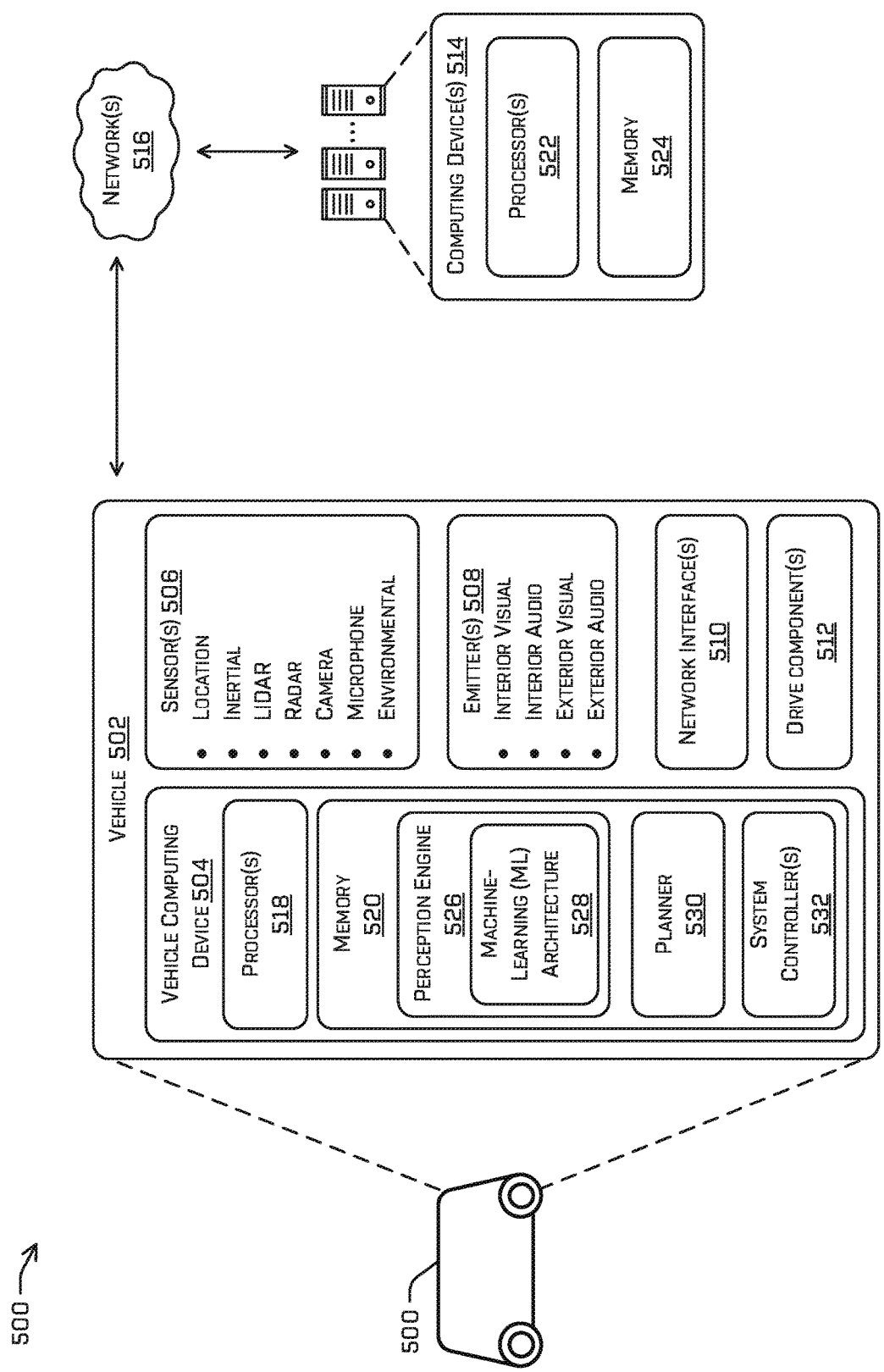
FIG. 5 illustrates a block diagram of an example system for training and/or using a sub-class machine-learning (ML) model.

FIG. 5 illustrates a block diagram of an example system that implements the techniques discussed herein. In some instances, the system 500 may include a vehicle 502, which may correspond to the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 502 may include a vehicle computing device 504, one or more sensor(s) 506, one or more emitters 508, one or more network interfaces 510, and/or one or more drive components 512.

In some instances, the sensor(s) 506 may include LIDAR sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., temperature sensors, humidity sensors, light sensors, pressure sensors, etc.), etc. The sensor(s) 506 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device 504.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.)

to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface (s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with a computing device(s) 514. In some examples, computing device(s) 514 may comprise one or more nodes of a distributed computing system (e.g., a cloud computing architecture).

The network interface(s) 510 may include physical and/or logical interfaces for connecting the vehicle computing device 504 to another computing device or a network, such as network(s) 516. For example, the network interface(s) 510 may enable Wi-Fi-based communication such as via frequencies defined by the IEEE 500.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device 504 may include one or more processors 518 and memory 520 communicatively coupled with the one or more processors 518. Computing device(s) 514 may additionally or alternatively include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store a perception engine 526, which may comprise an ML architecture 528, a planner 530, and/or system controller(s) 532. Perception engine 526 may represent perception engine 110, ML architecture 528 may include and/or represent example architecture 300, planner 530 may represent planner 112. In some instances, perception engine 526 may comprise a primary perception system, a secondary perception system, a prediction system, and/or a localization system. The memory 520 and/or 524 may additionally or alternatively store a mapping system, a planning system, a ride management system, etc. Although perception engine 526 and ML architecture 528 are illustrated as being stored in memory 520, perception engine 526 and/or ML architecture 528 may be stored in memory 524 and/or may include processor-executable instructions, machine-learned model(s), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

Memory 520 may additionally or alternatively store one or more system controller(s) 532 (which may additionally or alternatively be implemented as hardware), which may be configured to control steering, propulsion, braking, safety, emitters, communication, and other systems of the vehicle 502. These system controller(s) 532 may communicate with and/or control corresponding systems of the drive component(s) 512 and/or other components of the vehicle 502. For example, the planner 530 may generate instructions based at least in part on a classification, sub-classification, and/or ROI generated by the perception engine 526 and transmit the instructions to the system controller(s) 532, which may control operation of the vehicle 502 based at least in part on the instructions.

It should be noted that while FIG. 5 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

Example Clauses

A. A method comprising: receiving, from a sensor of an autonomous vehicle, an image; providing, as input to a first neural network, the image; receiving, from the first neural network, a feature map, a region of interest, a classification, and a first probability associated with an object represented in the image; providing, as input to a second neural network, at least a portion of the feature map that corresponds to the region of interest; receiving, from the second neural network, a sub-classification and a second probability associated therewith; and controlling operation of the autonomous vehicle based at least in part on at least one of the classification or the sub-classification.

B. The method of paragraph A, further comprising: outputting the classification associated with the region of interest based at least in part on determining that the first probability meets or exceeds a first probability threshold; and outputting at least one of the classification or the sub-classification associated with the region of interest based at least in part on determining that the second probability meets or exceeds a second probability threshold.

C. The method of either paragraph A or B, the method further comprising: providing, as additional input to the second portion of the neural network, at least an additional feature map received from the first neural network, wherein the first neural network is trained to output at least one of an instance segmentation or a semantic segmentation.

D. The method of any one of paragraphs A-C, further comprising: transmitting, to the second neural network, the portion of the feature map based at least in part on receiving the classification and the classification being associated with the second neural network; and transmitting, to a third neural network, a second portion of a second feature map, based at least in part on receiving a second classification and the second classification being associated with the third neural network.

E. The method of any one of paragraphs A-D, the candidate classifications comprise at least two of: a pedestrian classification; a vehicle classification; a cyclist classification; a signage classification; an animal classification; and a traffic obstruction classification.

F. A system comprising: one or more processors; memory storing processor-executable instructions that, when executed by the one or more processors, cause the system to perform operations comprising: receiving sensor data; providing, as input to a first machine-learning (ML) model, the sensor data; receiving, from the first ML model, a classification associated with a representation of an object in the sensor data, a first probability associated with the classification, a feature map, and a region of interest of the sensor data associated with the representation of the object; and receiving, from a sub-class ML model, a sub-classification and a second probability associated with the sub-classification.

G. The system of paragraph F, the operations further comprising: inputting, into the sub-class ML model, at least a first portion of a first feature map received from a first portion of the first ML model and at least a second portion of a second feature map received from a second portion of the first ML model.

H. The system of either paragraph F or G, wherein the first portion and the second portion are based at least in part on the region of interest.

I. The system of any one of paragraphs F-H, wherein the second feature map comprises at least one of a semantic segmentation feature map, an instance segmentation feature map, a dense depth feature map, or an object orientation feature map.

J. The system of any one of paragraphs F-I, wherein the operations further comprise: outputting the classification associated with the object based at least in part on determining that the first probability meets or exceeds a first probability threshold; outputting the sub-classification in association with the object based at least in part on determining that the second probability meets or exceeds a second probability threshold; and controlling an autonomous vehicle based at least in part on at least one of the classification or the sub-classification.

K. The system of any one of paragraphs F-J, wherein the operations further comprise. providing to at least one of the first ML model or the sub-class ML model a ground truth sensor data, the ground truth sensor data associated with a ground truth classification label and a ground truth sub-classification label; determining a first loss based at least in part on a difference between a first output of the first ML model and a ground truth classification label; determining a second loss based at least in part on a difference between a second output of the sub-class ML model and the ground truth sub-classification label; and altering at least one of one or more first parameters of the first ML model or one or more second parameters of the sub-class ML model to minimize at least one of the first loss or the second loss.

L. The system of any one of paragraphs F-K, wherein: the second portion of the ML model is associated with a first classification, a third portion of the ML model is associated with a second classification, and the first classification and the second classification are candidate classifications associated with the first portion of the ML model.

M. The system of any one of paragraphs F-L, wherein the first classification and the second classification are two of a plurality of classifications, wherein the plurality of classifications comprises at least two of: a pedestrian classification; a vehicle classification; a cyclist classification; a signage classification; an animal classification; and a traffic obstruction classification.

N. The system of any one of paragraphs F-M, wherein: the first ML model comprises a first neural network comprising a plurality of first layers; and the sub-class ML model comprises a second neural network comprising a plurality of second layers.

O. The system of any one of paragraphs F-N, wherein: the first ML model comprises a first portion of a neural network comprising a plurality of first layers; and the sub-class ML model comprises a second portion of the neural network comprising a plurality of second layers.

P. A non-transitory computer-readable medium storing processor-executable instructions that, when executed by one or more processors, cause the one or more processors to perform operations comprising: receiving sensor data; providing, as input to a first machine-learning (ML) model, the sensor data; receiving, from the first ML model, a first output comprising a classification associated with a representation of an object in the sensor data, and a first probability associated with the classification; and receiving, from a sub-class ML model, a sub-classification and a second probability associated with the sub-classification.

Q. The non-transitory computer-readable medium of paragraph P, wherein the operations further comprise: receiving, from a first portion of the first ML model, a first feature map; receiving, from a second portion of the first ML model, a second feature map; inputting, into the sub-class ML model, at least a portion of the first feature map and at least a portion of the second feature map, wherein at least one of the first feature map or the second feature maps are associated with a region of interest associated with the representation of the object in the sensor data.

R. The non-transitory computer-readable medium of either paragraph P or Q, wherein: the ML model comprises at least a first ML model and a sub-class ML model, and the neural network is trained, based at least in part on: providing to at least one of the first ML model or the sub-class ML model a ground truth sensor data, the ground truth sensor data associated with a ground truth classification label and a ground truth sub-classification label; determining a first loss based at least in part on a difference between a first output of the first ML model and a ground truth classification label; determining a second loss based at least in part on a difference between a second output of the sub-class ML model and the ground truth sub-classification label; and altering at least one of one or more first parameters of the first ML model or one or more second parameters of the sub-class ML model to minimize at least one of the first loss or the second loss.

S. The non-transitory computer-readable medium of any one of paragraphs P-R, wherein the operations further comprise at least one of: outputting the classification in association with the object based at least in part on determining that the first probability is greater than or equal to a first probability threshold; outputting the sub-classification based at least in part on determining that the second probability is greater than or equal to a second probability threshold; or controlling an autonomous vehicle based at least in part on the classification and the sub-classification.

T. The non-transitory computer-readable medium of any one of paragraphs P-S, wherein: the sub-class ML model is a first sub-class ML model, the classification is a first classification, and the operations further comprising: receiving, from the first ML model, a first feature map associated with the first classification; receiving, from the first ML model, a second feature map associated with a second classification; providing, as input to the first sub-class ML model, a first portion of the first feature map based at least in part on the first classification being associated with the first sub-class ML model; and providing, as input to a second sub-class ML model, a second portion of the second feature map based at least in part on the second classification being associated with the second sub-class ML model.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving, from a sensor of an autonomous vehicle, an image;
   providing, as input to a first neural network, the image;
   receiving, from the first neural network, a feature map, a region of interest, a classification, and a first probability associated with an object represented in the image;
   providing, as input to a second neural network, at least a portion of the feature map that corresponds to the region of interest;
   receiving, from the second neural network, a sub-classification of the classification and a second probability associated with the subclassification; and
   controlling operation of the autonomous vehicle based at least in part on at least one of the classification or the sub-classification.

2. The method of claim 1, further comprising:
   outputting the classification associated with the region of interest based at least in part on determining that the first probability meets or exceeds a first probability threshold; and
   outputting at least one of the classification or the sub-classification associated with the region of interest based at least in part on determining that the second probability meets or exceeds a second probability threshold.

3. The method of claim 1, the method further comprising:
   providing, as additional input to the second portion of the neural network, at least an additional feature map received from the first neural network,
   wherein the first neural network is trained to output at least one of an instance segmentation or a semantic segmentation.

4. The method of claim 1, further comprising:
   transmitting, to the second neural network, the portion of the feature map based at least in part on receiving the classification and the classification being associated with the second neural network; and
   transmitting, to a third neural network, a second portion of a second feature map, based at least in part on receiving a second classification and the second classification being associated with the third neural network.

5. The method of claim 4, the candidate classifications comprise at least two of:
   a pedestrian classification;
   a vehicle classification;
   a cyclist classification;
   a signage classification;
   an animal classification; and
   a traffic obstruction classification.

6. A system comprising:
   one or more processors;
   memory storing processor-executable instructions that, when executed by the one or more processors, cause the system to perform operations comprising:
     receiving sensor data;
     providing, as input to a first machine-learning (ML) model, the sensor data;
     receiving, from the first ML model, a classification associated with a representation of an object in the sensor data, a first probability associated with the classification, a feature map, and a region of interest of the sensor data associated with the representation of the object; and
     receiving, from a sub-class ML model, a sub-classification of the classification and a second probability associated with the sub-classification.

7. The system of claim 6, the operations further comprising:
   inputting, into the sub-class ML model, at least a first portion of a first feature map received from a first portion of the first ML model and at least a second portion of a second feature map received from a second portion of the first ML model.

8. The system of claim 7, wherein the first portion and the second portion are based at least in part on the region of interest.

9. The system of claim 7, wherein the second feature map comprises at least one of a semantic segmentation feature map, an instance segmentation feature map, a dense depth feature map, or an object orientation feature map.

10. The system of claim 6, wherein the operations further comprise:
    outputting the classification associated with the object based at least in part on determining that the first probability meets or exceeds a first probability threshold;
    outputting the sub-classification in association with the object based at least in part on determining that the second probability meets or exceeds a second probability threshold; and
    controlling an autonomous vehicle based at least in part on at least one of the classification or the sub-classification.

11. The system of claim 6, wherein the operations further comprise:
    providing to at least one of the first ML model or the sub-class ML model a ground truth sensor data, the ground truth sensor data associated with a ground truth classification label and a ground truth sub-classification label;

determining a first loss based at least in part on a difference between a first output of the first ML model and a ground truth classification label;

determining a second loss based at least in part on a difference between a second output of the sub-class ML model and the ground truth sub-classification label; and altering at least one of one or more first parameters of the first ML model or one or more second parameters of the sub-class ML model to minimize at least one of the first loss or the second loss.

12. The system of claim 6, wherein:
the second portion of the ML model is associated with a first classification,
a third portion of the ML model is associated with a second classification, and
the first classification and the second classification are candidate classifications associated with the first portion of the ML model.

13. The system of claim 12, wherein the first classification and the second classification are two of a plurality of classifications, wherein the plurality of classifications comprises at least two of:
a pedestrian classification;
a vehicle classification;
a cyclist classification;
a signage classification;
an animal classification; and
a traffic obstruction classification.

14. The system of claim 6, wherein:
the first ML model comprises a first neural network comprising a plurality of first layers; and
the sub-class ML model comprises a second neural network comprising a plurality of second layers.

15. The system of claim 6, wherein:
the first ML model comprises a first portion of a neural network comprising a plurality of first layers; and
the sub-class ML model comprises a second portion of the neural network comprising a plurality of second layers.

16. A non-transitory computer-readable medium storing processor-executable instructions that, when executed by one or more processors, cause the one or more processors to perform operations comprising:
receiving sensor data;
providing, as input to a first machine-learning (ML) model, the sensor data;
receiving, from the first ML model, a first output comprising a classification associated with a representation of an object in the sensor data, and a first probability associated with the classification; and
receiving, from a sub-class ML model, a sub-classification of the classification and a second probability associated with the sub-classification.

17. The non-transitory computer-readable medium of claim 16, wherein the operations further comprise:
receiving, from a first portion of the first ML model, a first feature map;
receiving, from a second portion of the first ML model, a second feature map;
inputting, into the sub-class ML model, at least a portion of the first feature map and at least a portion of the second feature map,
wherein at least one of the first feature map or the second feature maps are associated with a region of interest associated with the representation of the object in the sensor data.

18. The non-transitory computer-readable medium of claim 16, wherein:
the ML model comprises at least a first ML model and a sub-class ML model, and
the ML model is trained, based at least in part on:
providing to at least one of the first ML model or the sub-class ML model a ground truth sensor data, the ground truth sensor data associated with a ground truth classification label and a ground truth sub-classification label;
determining a first loss based at least in part on a difference between a first output of the first ML model and a ground truth classification label;
determining a second loss based at least in part on a difference between a second output of the sub-class ML model and the ground truth sub-classification label; and
altering at least one of one or more first parameters of the first ML model or one or more second parameters of the sub-class ML model to minimize at least one of the first loss or the second loss.

19. The non-transitory computer-readable medium of claim 16, wherein the operations further comprise at least one of:
outputting the classification in association with the object based at least in part on determining that the first probability is greater than or equal to a first probability threshold;
outputting the sub-classification based at least in part on determining that the second probability is greater than or equal to a second probability threshold; or
controlling an autonomous vehicle based at least in part on the classification and the sub-classification.

20. The non-transitory computer-readable medium of claim 16, wherein:
the sub-class ML model is a first sub-class ML model,
the classification is a first classification, and
the operations further comprising:
receiving, from the first ML model, a first feature map associated with the first classification;
receiving, from the first ML model, a second feature map associated with a second classification;
providing, as input to the first sub-class ML model, a first portion of the first feature map based at least in part on the first classification being associated with the first sub-class ML model; and
providing, as input to a second sub-class ML model, a second portion of the second feature map based at least in part on the second classification being associated with the second sub-class ML model.

* * * * *